(12) United States Patent
McCann et al.

(10) Patent No.: US 7,298,536 B2
(45) Date of Patent: *Nov. 20, 2007

(54) FIBER OPTIC WAFER PROBE

(75) Inventors: Peter R. McCann, Beaverton, OR (US); John T. Martin, Portland, OR (US)

(73) Assignee: Cascade Microtech, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/221,676

(22) Filed: Sep. 7, 2005

(65) Prior Publication Data

US 2006/0008226 A1    Jan. 12, 2006

Related U.S. Application Data

(63) Continuation of application No. 09/849,152, filed on May 4, 2001, now Pat. No. 6,970,634.

(51) Int. Cl.
*G02B 6/06* (2006.01)

(52) U.S. Cl. .................. 359/117; 600/182; 607/93

(58) Field of Classification Search ........ 385/115–119, 385/139, 12, 13; 356/241.1; 607/93; 600/182
See application file for complete search history.

(56) References Cited

U.S. PATENT DOCUMENTS

| | | | |
|---|---|---|---|
| 3,740,900 A | 6/1973 | Youmans et al. | |
| 3,952,156 A | 4/1976 | Lahr | |
| 4,383,217 A | 5/1983 | Shiell | |
| 4,401,945 A | 8/1983 | Juengel | |
| 4,515,439 A | 5/1985 | Esswein | |
| 4,641,659 A | 2/1987 | Sepponen | |
| 4,652,082 A | 3/1987 | Warner | |
| 4,696,544 A | 9/1987 | Costella | |
| 4,705,447 A | 11/1987 | Smith | |
| 4,727,637 A | 3/1988 | Buckwitz et al. | |
| 4,746,857 A | 5/1988 | Sakai et al. | |
| 4,788,851 A | 12/1988 | Brault | |
| 4,805,627 A | 2/1989 | Klingenbeck et al. | |
| 4,818,059 A | 4/1989 | Kakii et al. | |
| 4,864,227 A | 9/1989 | Sato | |
| 4,891,584 A | 1/1990 | Kamieniecki et al. | |
| 4,922,186 A | 5/1990 | Tsuchiya et al. | |
| 4,970,386 A | 11/1990 | Buck | |
| 4,972,073 A | 11/1990 | Lessing | |
| 5,001,423 A | 3/1991 | Abrami et al. | |
| 5,097,207 A | 3/1992 | Blanz | |
| 5,101,453 A * | 3/1992 | Rumbaugh | 385/12 |
| 5,159,264 A | 10/1992 | Anderson | |
| 5,159,267 A | 10/1992 | Anderson | |
| 5,202,558 A | 4/1993 | Barker | |
| 5,232,789 A | 8/1993 | Platz et al. | |
| 5,233,197 A | 8/1993 | Bowman et al. | |

(Continued)

FOREIGN PATENT DOCUMENTS

DE    3637549    5/1988

(Continued)

*Primary Examiner*—Leonidas Boutsikaris
(74) *Attorney, Agent, or Firm*—Chernoff, Vilhauer, McClung & Stenzel

(57) ABSTRACT

A fiber optic wafer probe that includes a fibre optic cable for approaching a device under test.

6 Claims, 6 Drawing Sheets

U.S. PATENT DOCUMENTS

| | | | |
|---|---|---|---|
| 5,267,088 A | 11/1993 | Nomura | |
| 5,270,664 A | 12/1993 | McMurtry et al. | |
| 5,298,972 A | 3/1994 | Heffner | |
| 5,315,237 A | 5/1994 | Iwakura et al. | |
| 5,317,656 A | 5/1994 | Moslehi et al. | |
| 5,321,453 A | 6/1994 | Mori et al. | |
| 5,404,111 A | 4/1995 | Mori et al. | |
| 5,408,189 A | 4/1995 | Swart et al. | |
| 5,412,330 A | 5/1995 | Ravel et al. | |
| 5,430,813 A | 7/1995 | Anderson et al. | |
| 5,481,196 A | 1/1996 | Nosov | |
| 5,505,150 A | 4/1996 | James et al. | |
| 5,621,400 A | 4/1997 | Corbi | |
| 5,633,780 A | 5/1997 | Cronin | |
| 5,642,298 A | 6/1997 | Mallory et al. | |
| 5,644,248 A | 7/1997 | Fujimoto | |
| 5,656,942 A | 8/1997 | Watts et al. | |
| 5,666,063 A | 9/1997 | Abercrombie et al. | |
| 5,704,355 A | 1/1998 | Bridges | |
| 5,715,819 A | 2/1998 | Svenson et al. | |
| 5,728,091 A | 3/1998 | Payne et al. | |
| 5,731,920 A | 3/1998 | Katsuragawa | |
| 5,767,690 A | 6/1998 | Fujimoto | |
| 5,803,607 A | 9/1998 | Jones et al. | |
| 5,804,982 A | 9/1998 | Lo et al. | |
| 5,829,437 A | 11/1998 | Bridges | |
| 5,831,442 A | 11/1998 | Heigl | |
| 5,841,288 A | 11/1998 | Meaney et al. | |
| 5,852,232 A | 12/1998 | Samsavar et al. | |
| 5,879,289 A | 3/1999 | Payne et al. | |
| 5,900,737 A | 5/1999 | Graham et al. | |
| 5,944,093 A | 8/1999 | Viswanath | |
| 5,945,836 A | 8/1999 | Sayre et al. | |
| 6,006,002 A | 12/1999 | Motoki et al. | |
| 6,031,383 A | 2/2000 | Streib et al. | |
| 6,032,714 A | 3/2000 | Fenton | |
| 6,034,533 A | 3/2000 | Terro et al. | |
| 6,061,589 A | 5/2000 | Bridges et al. | |
| 6,064,213 A | 5/2000 | Khandros et al. | |
| 6,064,217 A | 5/2000 | Smith | |
| 6,071,009 A * | 6/2000 | Clyne | 374/137 |
| 6,096,567 A | 8/2000 | Kaplan et al. | |
| 6,127,831 A | 10/2000 | Khoury et al. | |
| 6,172,337 B1 | 1/2001 | Johnsgard et al. | |
| 6,181,416 B1 | 1/2001 | Falk | |
| 6,191,596 B1 | 2/2001 | Abiko | |
| 6,211,663 B1 | 4/2001 | Moulthrop et al. | |
| 6,215,295 B1 | 4/2001 | Smith, III | |
| 6,222,031 B1 | 4/2001 | Wakabayashi et al. | |
| 6,222,970 B1 * | 4/2001 | Wach et al. | 385/115 |
| 6,257,564 B1 | 7/2001 | Avneri et al. | |
| 6,271,673 B1 | 8/2001 | Furuta et al. | |
| 6,275,738 B1 | 8/2001 | Kasevich et al. | |
| 6,278,051 B1 | 8/2001 | Peabody | |
| 6,320,372 B1 | 11/2001 | Keller | |
| 6,340,895 B1 | 1/2002 | Uher et al. | |
| 6,396,296 B1 | 5/2002 | Tarter et al. | |
| 6,415,858 B1 | 7/2002 | Getchel et al. | |
| 6,448,788 B1 | 9/2002 | Meaney et al. | |
| 6,481,939 B1 | 11/2002 | Gillespie et al. | |
| 6,490,471 B2 | 12/2002 | Svenson et al. | |
| 6,528,993 B1 | 3/2003 | Shin et al. | |
| 6,572,608 B1 | 6/2003 | Lee et al. | |
| 6,611,417 B2 | 8/2003 | Chen | |
| 6,628,503 B2 | 9/2003 | Sogard | |
| 6,798,226 B2 | 9/2004 | Altmann et al. | |
| 2002/0008533 A1 | 1/2002 | Ito et al. | |
| 2002/0009377 A1 | 1/2002 | Shafer | |
| 2002/0009378 A1 | 1/2002 | Obara | |
| 2002/0011859 A1 | 1/2002 | Smith et al. | |
| 2002/0011863 A1 | 1/2002 | Takahashi et al. | |
| 2002/0070745 A1 | 6/2002 | Johnson et al. | |
| 2002/0153909 A1 | 10/2002 | Petersen | |
| 2002/0180466 A1 | 12/2002 | Hiramatsu et al. | |
| 2003/0030822 A1 | 2/2003 | Finarov | |
| 2003/0088180 A1 | 5/2003 | Van Veen | |
| 2003/0139662 A1 | 7/2003 | Seidman | |
| 2003/0139790 A1 | 7/2003 | Ingle | |
| 2003/0184332 A1 | 10/2003 | Tomimatsu et al. | |
| 2004/0021475 A1 | 2/2004 | Ito et al. | |
| 2004/0100297 A1 | 5/2004 | Tanioka et al. | |
| 2004/0113640 A1 | 6/2004 | Cooper | |
| 2004/0134899 A1 | 7/2004 | Hiramatsu et al. | |
| 2004/0207072 A1 | 10/2004 | Hiramatsu et al. | |

FOREIGN PATENT DOCUMENTS

| | | |
|---|---|---|
| DE | 195 42 955 | 11/1995 |
| DE | 197 49 687 | 11/1997 |
| DE | 20220754 | 5/2004 |
| EP | 0846476 | 6/1998 |
| JP | 55-115383 | 9/1980 |
| JP | 56-88333 | 7/1981 |
| JP | 57-75480 | 5/1982 |
| JP | 57-163035 | 10/1982 |
| JP | 62-98634 | 5/1987 |
| JP | 62-107937 | 5/1987 |
| JP | 3-196206 | 8/1991 |
| JP | 3-228348 | 10/1991 |
| JP | 4-130639 | 5/1992 |
| JP | 4-159043 | 6/1992 |
| JP | 4-206930 | 7/1992 |
| JP | 5-82631 | 4/1993 |
| JP | 61-54238 | 6/1994 |
| JP | 6154238 | 6/1994 |
| JP | 8-330401 | 12/1996 |
| JP | 09127432 | 5/1997 |
| JP | 11-023975 | 1/1999 |
| JP | 2002-243502 | 8/2002 |
| WO | WO PCT/EP93/02774 | 10/1993 |
| WO | WO 94/10554 | 5/1994 |

* cited by examiner

FIBER OPTIC WAFER PROBE

CROSS-REFERENCE TO RELATED APPLICATIONS

This application is a continuation of U.S. patent application Ser. No. 09/849,152, filed May 4, 2001 now U.S. Pat. No. 6,970,634.

BACKGROUND OF THE INVENTION

The present invention relates to fiber optic probes for use in making on-wafer measurements of the parameters of photodetectors and other optoelectronic devices.

An existing fiber optic probe for use in making measurements is shown in Modolo et al., "Wafer Level High-Frequency Measurements of Photodetector Characteristics," Applied Optics, volume 27, pages 3059-3061 (1988). In the Modolo et al. probe, an optical fiber is pressure fitted into the grooved periphery of a disc segment mounted on a probe arm so that the fiber extends longitudinally through a bend of 90 degrees around the disc segment and thence to a pulsed optical signal source. To probe a given device, the probing end of the optical fiber is advanced longitudinally toward the surface of the test device until it is approximately 100 micrometers from the surface of the device.

One of the limitations of the Modolo et al. probe is that the optical fiber is pressure fitted into the peripheral groove of the disc segment and therefore cannot move longitudinally relative to the disc segment. Thus, as the probing end of the optical fiber is moved longitudinally toward the surface of the test device, any slight over travel of movement will cause the end of the fiber to impact against the surface causing possible damage either to the surface of the test device or to the end of the fiber, or both.

Rumbaugh, U.S. Pat. No. 5,101,453, discloses a fiber optic wafer probe that includes a probe body along which an optical fiber extends to protrude from the tip of the probe body. The probe body loosely guides the optical fiber so that at least a significant portion of the length of the optical fiber is movable longitudinally with respect to the tip and probe body. The purpose of the movability of the optical fiber is to enable the optical fiber to buckle longitudinally in response to longitudinal over-travel of the fiber toward the test device. After repeated use, the optical fiber is replaced by a new optical fiber and connector. Unfortunately, replacement of the optical fiber insert is both expensive and time consuming. Further, the angle of incidence provided by the optical probe may be unsuitable for a particular probe station or probing requirements. Moreover, the bulky nature of the optical probe make it unsuitable for environments with limited available space.

Clyne, U.S. Pat. No. 6,071,009, discloses a tubular arrangement with a fiber optic lead contained therein specifically designed for measuring the surface temperature of wire-bonded semiconductors and the like. A temperature sensor is attached to the end of the fiber optic lead to facilitate temperature measurements. However, the design disclosed by Clyne is specifically designed for surface temperature measurements and is generally ineffective for optical probing of semiconductor wafers.

DETAILED DESCRIPTION OF PREFERRED EMBODIMENT

Figure 1:
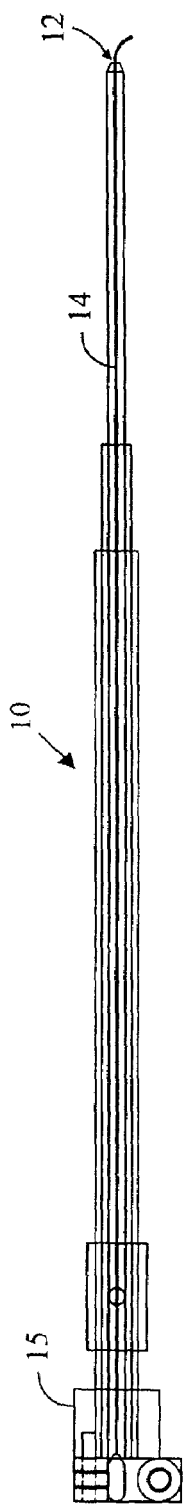
FIG. 1 is a side view of an exemplary embodiment of a fibre optic probe.

The present inventors considered existing fiber optic probe wafer probes and determined that their design limits the existing probe's ability to accurately test a semiconductor wafer. Referring to FIG. 1, the preferred embodiment of a fiber optic probe of the present invention comprises a probe body, indicated generally as 10. The probe body 10 has a probe tip 12 at one end and an optical fiber support 15 at the other end. The probe body 10 is preferably generally tubular with an optical fiber 14 extending through and out the end of the probe tip 12. It is to be understood that the tubular cross sectional profile may be any shape, as desired. The tubular probe body 10 is preferably circular which facilitates a decreased profile so that the probe body 10 may be more readily used with probe stations that have limited space for accessing the device under test. The probe body 10 preferably has a substantially uniform vertical cross sectional height along a major length of the probe body 10, especially the end proximate the probe tip 12. Likewise, the probe body 10 preferably has a substantially uniform horizontal cross sectional width along a major length of the probe body 10, especially proximate probe tip 12. Other cross sectional profiles for the probe body 10 may likewise be used, as desired.

The cavity defined within the probe body 10 along a substantial or major portion of its length is preferably closely surrounding the optical fiber 14 maintained therein. With the optical fiber 14 maintained in such a close relationship to the cavity, a major portion of (or substantially all of) the optical fiber 14 is effectively restrained from free lateral movement along the length of the probe body 10 during testing (or otherwise), in the event of contact with the optical probe and the device under test. Further, by resisting free movement of the optical fiber during testing the end of the optical fiber may be maintained in at a more predetermined location to optimize optical coupling and increases the placement accuracy of the end of the optical fiber during testing.

After further consideration of the internal profile of the probe body 10 the present inventors determined that a tapered profile toward the probe tip 12 permits the optical fiber to be more easily inserted within the probe body 10. While the region proximate the probe tip 12 may provide the primary resistance to free lateral movement of the optic fiber, a major portion of the remaining portion of the probe body 10 maintains the optical fiber relatively stationary, which may improve measurements made with the fibre optic probe. Preferably, the cross sectional area near the tip is less than the cross sectional area near the middle, which is likewise less than the cross sectional area near the end proximate the support 15.

In order to achieve improved usability for the fibre optic probe to be used in a multitude of different environments, the probe body 10 is preferably readily bendable to adjust the angle of the probe tip with respect to the probe body. In this manner, the angle of incidence of the optical fibre may be selected and otherwise adjusted to achieve increased performance.

Figure 2A:
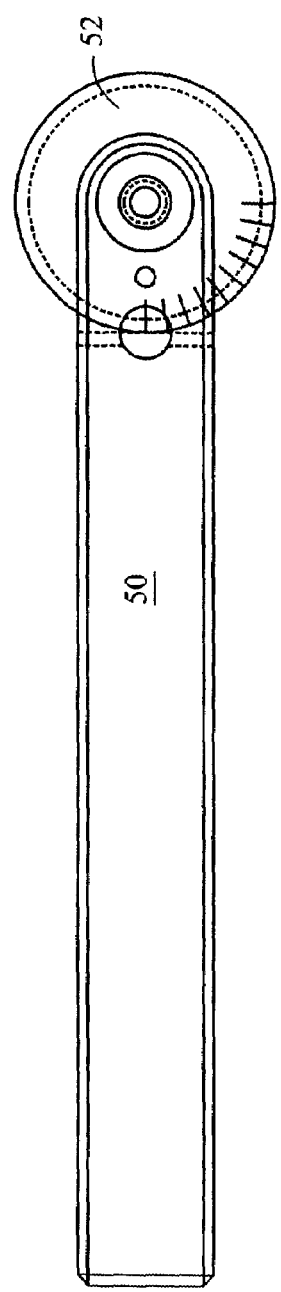
FIG. 2A is a side view of a probe bending tool.
Figure 2B:
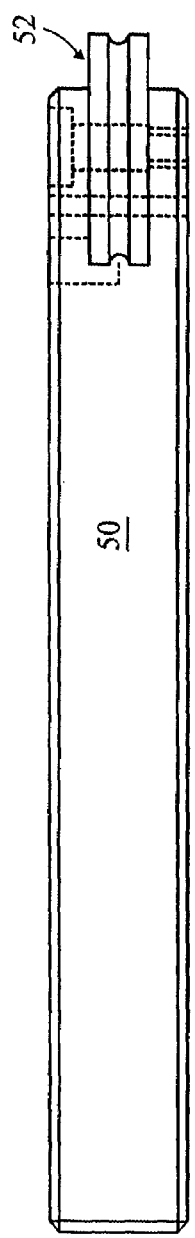
FIG. 2B is a top view of the probe bending tool of FIG. 2A.
Figure 3:
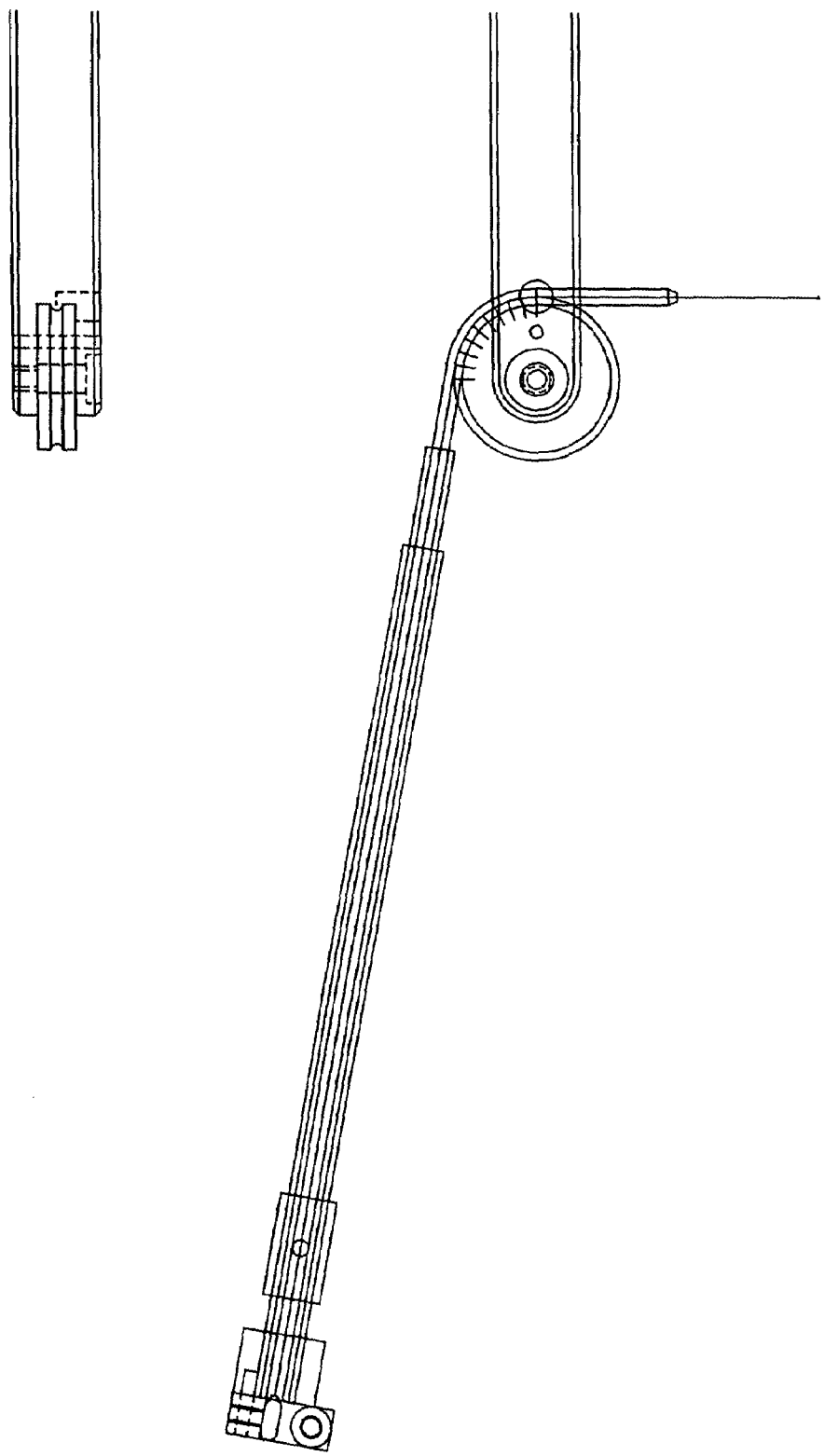
FIG. 3 is a side view of the probe being bent by the bending tool.
Figure 4A:
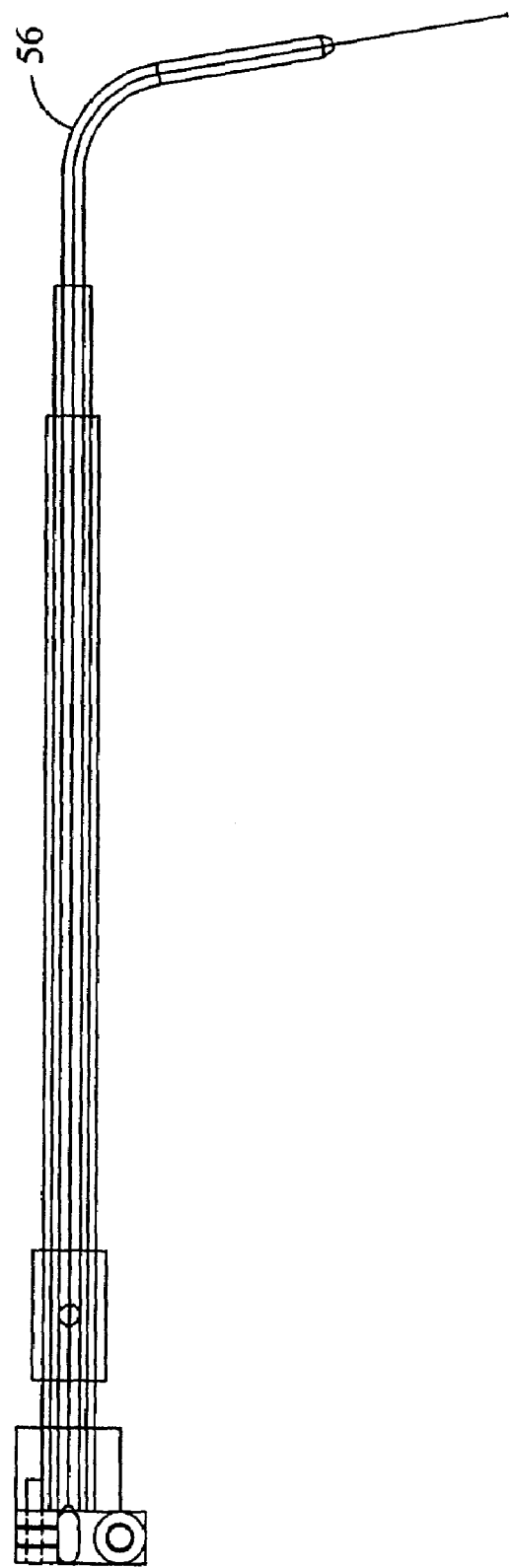
FIG. 4A is a side view of the resulting bent probe.

To bend the probe body 10, preferably with the optical fibre contained therein, a bending tool may be used, as shown in FIGS. 2A and 2B. The bending tool includes a handle 50 and a grooved circular member 52 maintained in a stationary position relative to the handle 50. The distal portion of the probe body 10 is inserted between the handle 50 and the grooved circular member 52, as shown by FIG. 3, and gently bent into the desired angle. Referring to FIG. 4A, the resulting probe body 10 will maintain the curved portion.

The preferred material from which the exterior of the probe body 10 is constructed of is a flexible metallic or conductive material. After consideration of the properties of a metallic material the present inventors determined that the metallic material has a tendency to "kink" or otherwise crimp the optical fiber contained therein when bent. In order to reduce the likelihood of damaging the optical fibre, while maintaining the relatively close relationship between the tubular cavity and the optical fiber, the present inventors determined that an internal capillary material constructed from any suitable material may be used. Within the probe body the capillary material preferably closely surrounds the optical fiber, as previously described. The capillary material preferably extends from the probe tip through a significant or major portion of the probe body 10, such as past the anticipated bent portion 56. The capillary material is selected from any suitable material such that it has a lesser tendency to crimp or otherwise deform than the external material, such as metal. Preferably, the range of bending is up to 90°, but may be from 10°-60°, if desired. It is to be understood that the optical fibre does not necessarily need to be maintained within an elongate cavity. It is sufficient, that the optical fibre extends longitudinally along a portion of the probe body.

Figure 6:
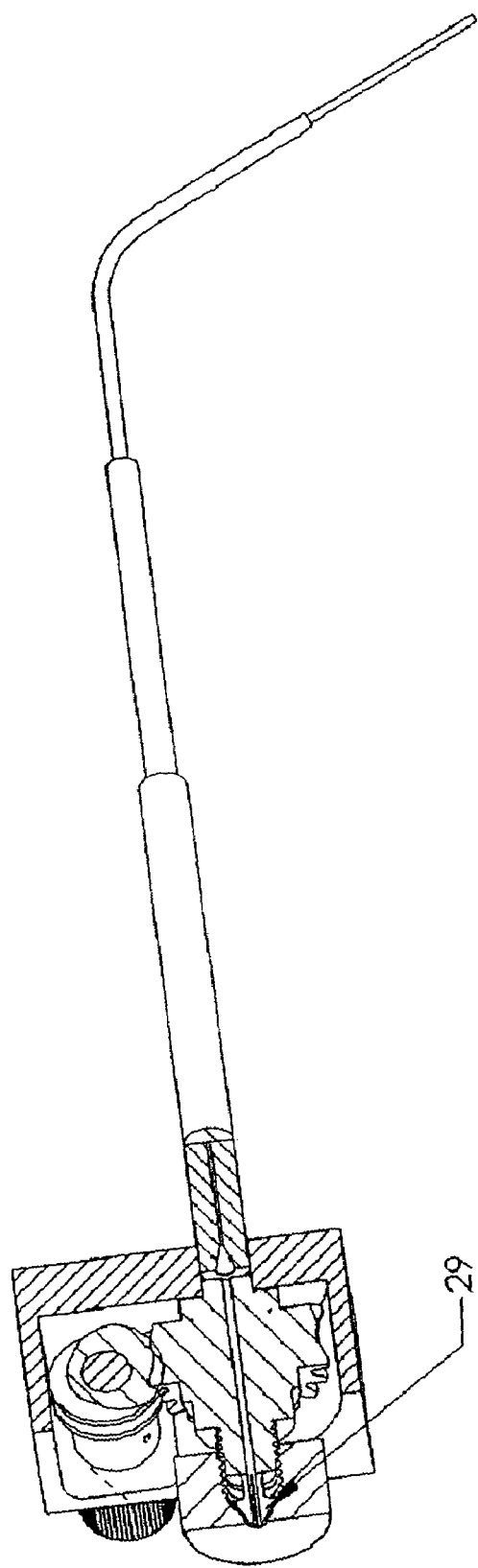
FIG. 6 is an exemplary collet that may be used with the fibre optic probe.

The optical fiber 14 may be connected to a conventional optical fiber connector at one end, such as that disclosed by Rumbaugh, U.S. Pat. No. 5,101,453. Unfortunately, the connection of the combination of an optical fiber 14 and the connector results in significant expense over the life of the product to periodically replace the optical fibre. In addition, after initially adjusting the length of the optical fibre, it is difficult to trim the end of the optical fiber again to remove a damaged portion at the end thereof. Moreover, the connector maintains the optical fiber in a fixed rotational position which may result in twisting the optical fiber during use thus increasing the likelihood of breaking the optical fiber. To overcome these limitations, the present inventors have determined that extending the optical fibre through a support 15 to a light signal source 60 is preferable. The support 15 preferably rotatably secures the optical fiber 14 to maintain the terminal portion of the optical fiber at the proper position. The support 15 may include a collet 29 (see FIG. 6), or other fiber optical securement structure. The collet 29 preferably supports a major portion of the circumference of the optical fiber 14 so that pressure is distributed thereon to reduce the likelihood of damage to the optical fiber 14. With a selectively detachable securement structure, the support 14 may release the optical fibre 14 and the length of the optical fiber 14 may be adjusted or the optical fiber may be free to rotate, or otherwise maintained free from a rigid theta orientation. Adjustment of the length of the optical fiber 14 is preferably performed by moving it longitudinally with respect to the probe body. This permits adjustment of the length of the optical fiber 14 which is more convenient than moving the support 14 for the probe body. After adjusting the length of the optical fiber 14, the end of the optical fiber 14 extending beyond the probe tip 12 may be cut or otherwise trimmed, as desired. This permits removal of a damaged portion of the optical fiber 14 without having to replace an entire portion of the optical fiber 14 for the wafer probe. With the securement structure released, the optical fiber 14 may be free to rotate, permitting the optical fiber 14 to be readily untwisted.

The collet 29 or other fiber securement structure may also be rotatable within the support 14, or otherwise replace the support 14, to permit a controlled rotation of the optical fiber 14 about its longitudinal axis. This theta adjustment permits rotational adjustment of the end of the optical fiber 14 with respect to the wafer without releasing the securement structure which may result in improved testing, especially if the end of the optical fiber 14 is cut at a non-perpendicular orientation with respect to the length of the fiber. In the preferred embodiment, gear teeth around the perimeter of the collet 29 mesh with a helical thread on an adjustment knob.

Figure 4B:
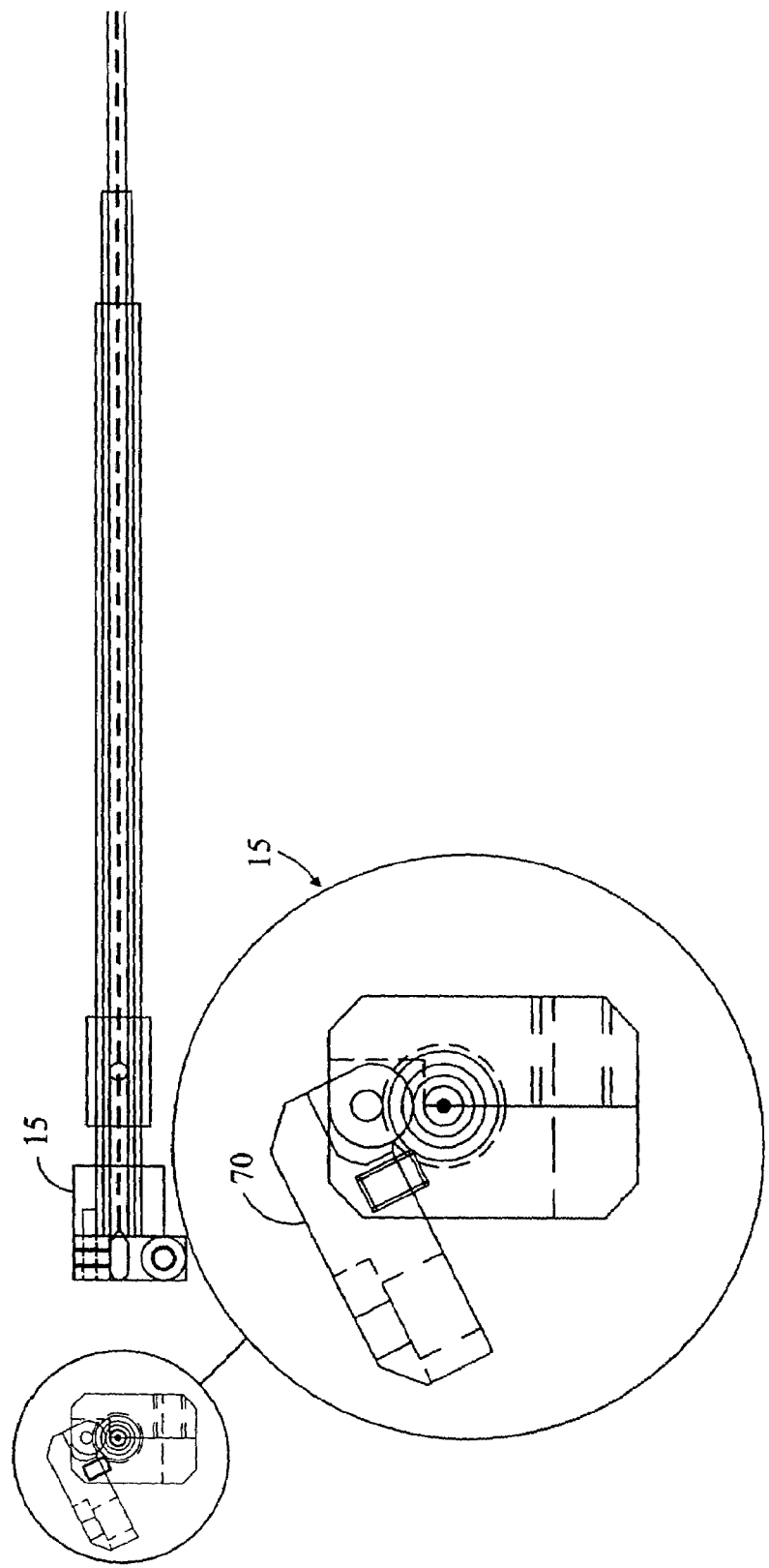
FIG. 4B is a side view of the probe including a detailed view of a support for the probe.
Figure 5:
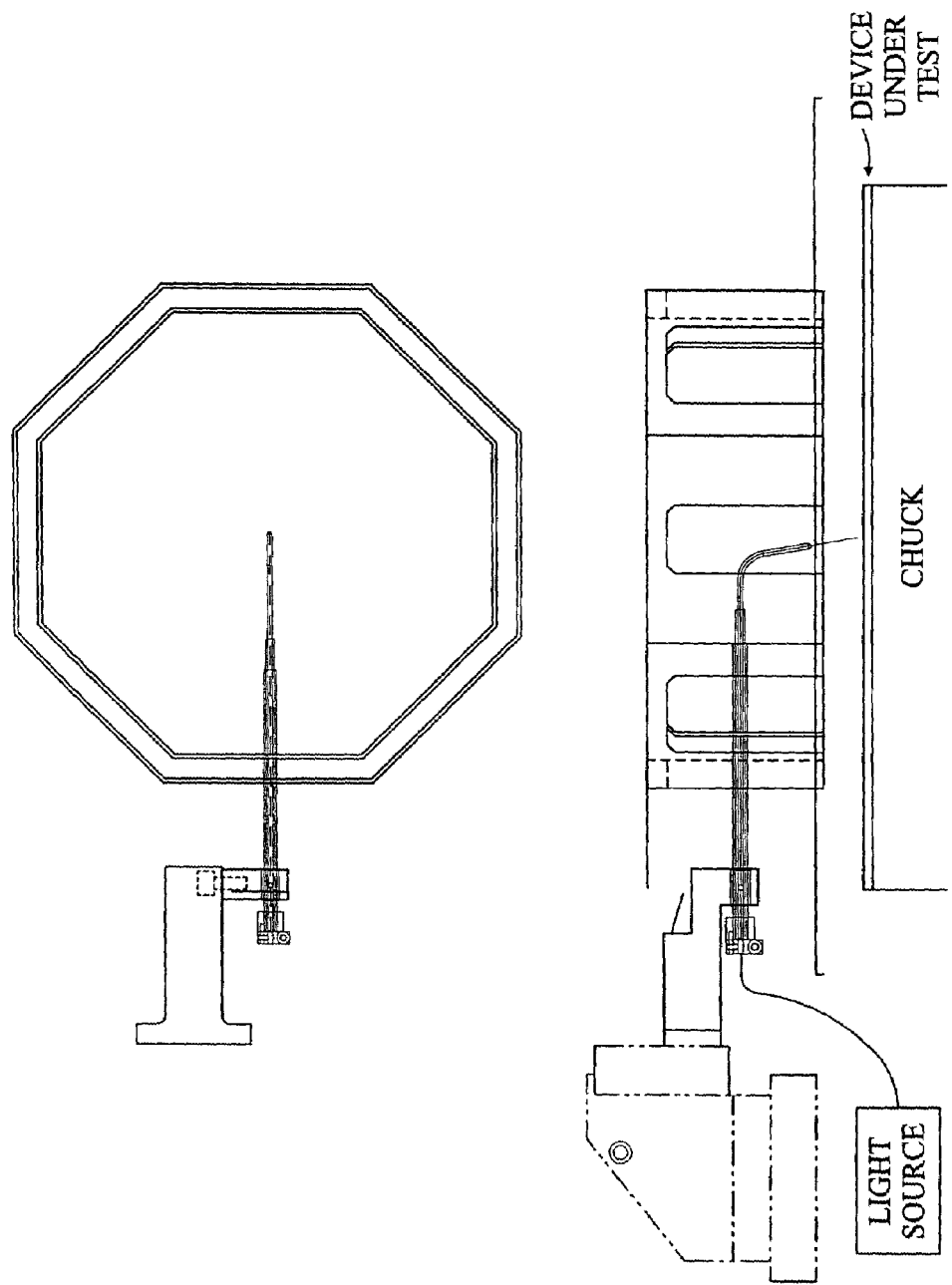
FIG. 5 is the probe proving a device under test.

Referring to FIG. 4B, the preferred support 15 is illustrated together with a hinged releasing mechanism 70. The support 15 provides the aforementioned features, as previously mentioned. It is to be understood that the support may be designed in any fashion, as desired. Referring to FIG. 5, the fiber optical wafer probe may be used for testing a device under test. The preferred embodiment is particularly suitable for testing a device under test when the probe station includes a top hat 72, which limits the available space of the probe body 12.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A fiber optic probe comprising:
    (a) a probe body having a tip for selectively approaching a device under test;
    (b) an elongate optical fiber extending longitudinally along said body and extending beyond said tip;
    (c) said probe body being sized such that at least a major portion of said elongate optical fiber is maintained free from freely moving with respect to said probe body in a direction transverse to a longitudinal axis of said elongate optical fiber when said tip makes pressing engagement with said device under test during testing; and
    (d) a support that selectively, disengageably maintains said optical fiber from freely moving longitudinally with respect to said probe body, and a collet rotatable with respect to said support, said collet engaged with said elongate optical fiber so as to permit controlled rotation of said fiber while said support maintains said fiber from freely moving longitudinally with respect to said probe body.

2. The optic probe of claim 1 further comprising said probe body proximate said tip including an inner material closely surrounding said elongate optical fiber, said probe body proximate said tip including another layer surrounding said inner material, wherein said inner layer of material has a greater tendency to maintain its cross sectional area while being flexed up to approximately 90° than said another layer while being flexed, when said another layer is free from said inner layer of material.

3. A method of adjusting an optoelectronic probing device comprising:
(a) providing a probe body having a tip for selectively approaching a device under test;
(b) extending an elongate optical fiber longitudinally along said body and extending beyond said tip;
(c) engaging said probe body with a bending tool;
(d) bending a portion of said probe body by cooperation of said probe body and said bending tool;
(e) disengaging said probe body from said bending tool; and
(f) providing a support that selectively, disengageably maintains said optical fiber from freely moving longitudinally with respect to said probe body, and a collet rotatable with respect to said support, said collet engaged with said elongate optical fiber so as to permit controlled rotation of said fiber while said support maintains said fiber from freely moving longitudinally with respect to said probe body.

4. The method of claim 3 further comprising:
(a) selectively maintaining a major portion of said optical fiber from freely moving longitudinally with respect to said probe body;
(b) longitudinally adjusting a major portion of said optical fiber toward said tip; and
(c) selectively maintaining a major portion of said optical fiber from freely moving longitudinally with respect to said probe body after said longitudinally adjusting.

5. A fiber optic probe comprising:
(a) a probe body having a tip for selectively approaching a device under test;
(b) an elongate optical fiber extending longitudinally along said body and extending beyond said tip; and
(c) a structure that permits selective controlled rotation of at least a portion of said optical fiber with respect to said probe body while simultaneously maintaining a major potion of said optical fiber from freely moving longitudinally with respect to said probe body.

6. A fiber optic probe comprising:
(a) a probe body having a tip for selectively approaching a device under test;
(b) an elongate optical fiber extending longitudinally along said body and extending beyond said tip;
(c) said probe body being sized such that at least a major portion of said elongate optical fiber is maintained free from freely moving with respect to said probe body in a direction transverse to a longitudinal axis of said elongate optical fiber when said tip makes pressing engagement with said device under test during testing;
(d) a support for selectively maintaining said optical fiber from freely moving longitudinally with respect to said probe body; and
(e) wherein said probe body proximate said tip including an inner material closely surrounding said elongate optical fiber, said probe body proximate said tip including another layer surrounding said inner material, wherein said inner layer of material has a greater tendency to maintain its cross sectional area while being flexed up to approximately 90° than said another layer while being flexed, when said another layer is free from said inner layer of material.

* * * * *

UNITED STATES PATENT AND TRADEMARK OFFICE
CERTIFICATE OF CORRECTION

PATENT NO. : 7,298,536 B2
APPLICATION NO. : 11/221676
DATED : November 20, 2007
INVENTOR(S) : Peter R. McCann and John T. Martin Page 1 of 1

It is certified that error appears in the above-identified patent and that said Letters Patent is hereby corrected as shown below:

<u>Col. 2, line 9</u>

Change "proving" to --probing--.

Signed and Sealed this

Thirteenth Day of May, 2008

JON W. DUDAS
*Director of the United States Patent and Trademark Office*